US012775479B2

(12) United States Patent
Sutton et al.

(10) Patent No.: US 12,775,479 B2
(45) Date of Patent: Oct. 27, 2026

(54) GAME PLATFORM FEATURE DISCOVERY

(71) Applicant: Sony Interactive Entertainment Inc., Tokyo (JP)

(72) Inventors: Ryan Sutton, Venice, CA (US); Jason Grimm, Sunnyvale, CA (US); Satish Uppuluri, Dublin, CA (US); Elizabeth Ruth Juenger, San Francisco, CA (US); Gary Grossi, San Francisco, CA (US); Yuji Tsuchikawa, Culver City, CA (US); Mingtao Wu, San Francisco, CA (US); Brian Parsons, Oakland, CA (US)

(73) Assignee: SONY INTERACTIVE ENTERTAINMENT INC., Tokyo (JP)

( * ) Notice: Subject to any disclaimer, the term of this patent is extended or adjusted under 35 U.S.C. 154(b) by 0 days.

(21) Appl. No.: 17/890,152

(22) Filed: Aug. 17, 2022

(65) Prior Publication Data

US 2024/0061693 A1 Feb. 22, 2024

(51) Int. Cl.
*G06F 9/451* (2018.01)
*G06F 3/0484* (2022.01)
*A63F 13/533* (2014.01)
*A63F 13/79* (2014.01)

(52) U.S. Cl.
CPC ............ *G06F 9/453* (2018.02); *G06F 3/0484* (2013.01); *A63F 13/533* (2014.09); *A63F 13/79* (2014.09)

(58) Field of Classification Search
CPC ...... G06F 9/453; G06F 3/0484; A63F 13/533; A63F 13/79
See application file for complete search history.

(56) References Cited

U.S. PATENT DOCUMENTS 6,064,381 A * 5/2000 Harel ...................... G06F 9/453 715/705
2003/0018625 A1 1/2003 Tremblay
2003/0131016 A1 7/2003 Tanny et al.
(Continued)

OTHER PUBLICATIONS

International Search Report and Written Opinion for International Patent Application No. PCT/US2023/026263.
(Continued)

*Primary Examiner* — Kieu D Vu
*Assistant Examiner* — Alvaro R Calderon, IV
(74) *Attorney, Agent, or Firm* — Kilpatrick Townsend & Stockton LLP

(57) ABSTRACT

Feature discovery includes determining what a user is doing or trying to do with respect to a computer platform from situational awareness information relating to the user's use of the platform. Feature discovery logic is applied to the situational awareness information and personalized user information to determine (a) when to present information to the user regarding a platform feature or features relevant to what the user is doing or trying to do, (b) what information to present to the user regarding the feature(s), and (c) how to best present the information to the user with a user interface. After the user interface presents the information regarding the platform feature(s) the feature discovery logic, personalized user information, or situational awareness information are updated according to the user's response to presentation of the information.

28 Claims, 10 Drawing Sheets

(56) References Cited

U.S. PATENT DOCUMENTS

| | | | | |
|---|---|---|---|---|
| 2005/0268234 | A1* | 12/2005 | Rossi | G06F 9/453 715/705 |
| 2006/0026531 | A1* | 2/2006 | Lin | G06F 9/44505 715/808 |
| 2006/0050865 | A1* | 3/2006 | Kortum | G06F 9/453 379/265.06 |
| 2007/0157091 | A1* | 7/2007 | Wadhwa | G06F 9/453 715/708 |
| 2009/0089751 | A1* | 4/2009 | Raikes | G06F 9/453 717/120 |
| 2010/0058233 | A1 | 3/2010 | Chan et al. | |
| 2011/0131491 | A1* | 6/2011 | Lu | G06F 9/453 715/708 |
| 2014/0270494 | A1 | 9/2014 | Sawhney et al. | |
| 2015/0186153 | A1* | 7/2015 | Voronkov | G06F 9/453 715/708 |
| 2016/0291802 | A1* | 10/2016 | Beck | G06F 3/14 |
| 2017/0206096 | A1* | 7/2017 | Lubow | G06F 16/9577 |
| 2017/0269925 | A1* | 9/2017 | Edmonds | G06F 9/4405 |
| 2019/0188013 | A1* | 6/2019 | Krishna | G06Q 10/10 |

OTHER PUBLICATIONS

Takahama et al., "Adaflock: Adaptive feature discovery for human-in-the-loop predictive modeling." Proceedings of AAAI Conference on Artificial Intelligence. vol. 32, No. 1, 2018. Retrieved on Aug. 28, 2023 (Aug. 28, 2023) from entire document.

* cited by examiner

GAME PLATFORM FEATURE DISCOVERY

FIELD OF THE DISCLOSURE

Aspects of the present disclosure relate to computing platforms and more particularly to feature discovery for video game platforms.

BACKGROUND OF THE DISCLOSURE

The past half century has seen an explosion in the number, type, and complexity of computing systems and applications that run on them. This complexity can lead to a dizzying variety of features that are available to the end user. The number and variety of features depends somewhat on the nature of the computing platform, e.g., computing system, operating system software, or application software. For example, a common word processing application has a wide variety of features for creating, editing, and viewing documents, formatting text, inserting and modifying tables, artwork, graphics and hyperlinks. Things can be even more complicated when multiple applications, e.g., word processor, spreadsheet and database applications, all use the same operating system. Specialized computing platforms, such as video game consoles can have one set of features common to the platform itself and separate sets of features for each program, e.g., each game, running on the platform.

Users, even experienced users, are often not familiar with all of the features of a given platform. If users don't know about certain features it could detrimentally affect their satisfaction with and loyalty to the platform. In an attempt to address this, computer platforms often include a "help" feature. This feature allows the user to search for help on a particular topic. However, not all users are inclined to use such a feature and, even if they are, they are often unaware that that they are using the platform in a time-inefficient manner. To address this certain platforms include some form of automated help that advised users on using platform features more effectively and presented tips and keyboard shortcuts. Such forms of automated help were typically based on Bayesian algorithms. Unfortunately, such forms of automated help were widely reviled by users and eventually withdrawn.

It is within this context that aspects of the present disclosure arise.

BRIEF DESCRIPTION OF THE DRAWINGS

The teachings of the present disclosure can be readily understood by considering the following detailed description in conjunction with the accompanying drawings, in which.

DESCRIPTION OF THE SPECIFIC EMBODIMENTS

Figure 1:
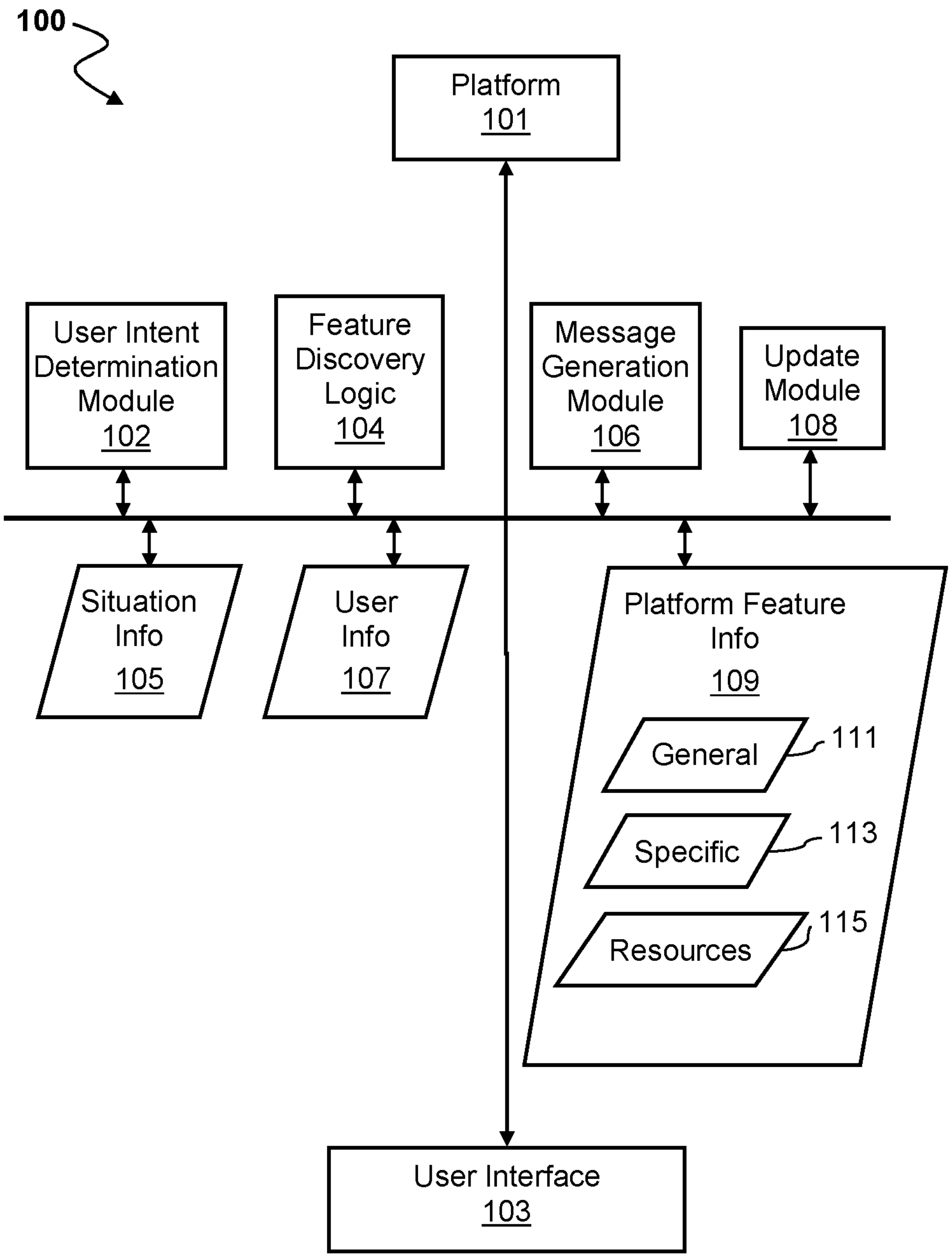
FIG. 1 is a block diagram illustrating a feature discovery system according to an aspect of the present disclosure.

Although the following detailed description contains many specific details for the purposes of illustration, anyone of ordinary skill in the art will appreciate that many variations and alterations to the following details are within the scope of the invention. Accordingly, the exemplary embodiments of the invention described below are set forth without any loss of generality to, and without imposing limitations upon, the claimed invention.

While numerous specific details are set forth in order to provide a thorough understanding of embodiments of the disclosure, it will be understood by those skilled in the art that other embodiments may be practiced without these specific details. In other instances, well-known methods, procedures, components and circuits have not been described in detail so as not to obscure the present disclosure. Some portions of the description herein are presented in terms of algorithms and symbolic representations of operations on data bits or binary digital signals within a computer memory. These algorithmic descriptions and representations may be the techniques used by those skilled in the data processing arts to convey the substance of their work to others skilled in the art.

An algorithm, as used herein, is a self-consistent sequence of actions or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

Unless specifically stated or otherwise as apparent from the following discussion, it is to be appreciated that throughout the description, discussions utilizing terms such as "processing", "computing", "converting", "reconciling", "determining" or "identifying," refer to the actions and processes of a computer platform which is an electronic computing device that includes a processor which manipulates and transforms data represented as physical (e.g., electronic) quantities within the processor's registers and accessible platform memories into other data similarly represented as physical quantities within the computer platform memories, processor registers, or display screen.

A computer program may be stored in a computer readable storage medium, such as, but not limited to, any type of disk including floppy disks, optical disks (e.g., compact disc read only memory (CD-ROMs), digital video discs (DVDs), Blu-Ray Discs™, etc.), and magnetic-optical disks, read-only memories (ROMs), random access memories (RAMs), EPROMs, EEPROMs, magnetic or optical cards, flash memories, or any other type of non-transitory media suitable for storing electronic instructions.

The terms "coupled" and "connected," along with their derivatives, may be used herein to describe structural relationships between components of the apparatus for performing the operations herein. It should be understood that these terms are not intended as synonyms for each other. Rather, in particular embodiments, "connected" may be used to indicate that two or more elements are in direct physical or electrical contact with each other. In some instances, "connected", "connection", and their derivatives are used to indicate a logical relationship, e.g., between node layers in a neural network (NN). "Coupled" may be used to indicated that two or more elements are in either direct or indirect (with other intervening elements between them) physical or electrical contact with each other, and/or that the two or more elements co-operate or communicate with each other (e.g., as in a cause an effect relationship).

Introduction

According to aspects of the present disclosure, a personalized feature discovery (FD) system provides a user with information regarding application features in a manner that is personalized, timely, and relevant. Feature discovery information is presented based on a combination of information pertinent to a particular user's engagement with a platform in conjunction with appropriate logic to determine what platform features to suggest to the user, when to suggest them, and how to suggest them. As an example, the FD system could catalog which features have been used and which have not as well as which features the system has or has not told the user about. The system could track user interaction with the platform and generate situational awareness information. The feature discovery system would then apply suitable logic to this information to determine whether, when and how to present feature discovery information to the user.

Feature Discovery

Generally speaking, feature discovery involves presenting information that helps users discover features that are valuable in that they can enhance their experience on the platform. Feature discovery according to aspects of the present disclosure can be characterized by (a) content of a message presented to the user that presents feature information personalized for that user, (b) the manner in which the message is presented to the user including, e.g., user interface (UI) components that present the message; and (c) logic that determines when to present tips, when to remove them and how to determine which ones to present if multiple tips apply.

FIG. 1 shows the general features of a feature discovery system 100 according to aspects of the present disclosure. The general purpose of the system is to provide a user of a computer platform 101 with assistance in discovering features of the platform. As used herein, the term "computer platform" or "platform" generally encompasses both computer systems and computer applications or programs. Examples of computer systems include, but are not limited to, general-purpose main frame, desktop, and laptop computers, special-purpose computers, such as gaming consoles, and mobile devices, such as tablet computers, cellular phones, smart phones, smart watches, and the like. Such systems generally include components that implement processing, memory, and data storage and generally include peripherals, such as a user interface 103, e.g., mouse, keyboard, display, speakers, microphone, touch pad or touch screen, game controller, and the like. In some implementations, the user interface 103 may include a mechanism, software or electronic circuitry configured to communicate with related devices, such as smart phones, smart watches, tablet computers, or audio/video devices via a wired data link or a wireless data link such as Bluetooth.

Examples of computer applications or programs include, but are not limited to, operating systems, productivity applications, e.g., word processing, spreadsheet, database, presentation, email, web browsers, and video games. Platforms also include networks, for example generalized networks, e.g., personal area networks, local area networks, wide area networks, the internet, or specialized networks, e.g., computer gaming networks associated with a specific gaming console.

The platform 101 is generally characterized by a plurality of features. Such features may include hardware and/or software that implement various functions of the platform. Features may include system-level platform hardware features, such as adjustment of screen brightness, text size, audio volume, speaker balance, and controller (e.g., mouse, joystick or game controller) sensitivity. Features may also include system-level software features, such as opening, closing, copying, or deleting files. Features may also include application-level specific features, such as features relating to navigation from one screen to another, navigation within a particular screen, or application functions such as creating, editing, formatting text, tables, graphics. Features may also include hardware features. For example, a video game platform may use peripheral hardware, such as a virtual reality (VR) headset. Such hardware may buttons, switches, or other controls that allow the user to adjust the appearance of images present by the headset. Furthermore, the headset may be configured to selectively operate in a see-through mode.

The system 100 generally includes a user intent determination module 102, feature discovery logic 104, a message generation module 106, and an update module 108. Important considerations in feature discovery include when to present feature information 109 to the user and what feature information to present. As discussed above, many users found previous virtual assistants annoying. According to aspects of the present disclosure the user intent determination logic 102, feature discovery logic 104, message generation module 106 and update module may be configured so that feature suggestions come at a time when the user needs them and in a manner the user will appreciate.

In general terms, the user intent module 102 determines what the user is trying to do and whether the user is having trouble trying to do it. The feature discovery logic 104 is then applied to situation information 105 and personalized user information 107 to determine (a) when to present information to the user regarding one or more features of the computer platform that are relevant to what the user is doing or trying to do, (b) what information to present to the user regarding the one or more features of the computer platform, and (c) how to best present the information regarding the one or more features of the computer platform to the user with a user interface. The message generation module 106 causes the user interface 103 to present the information regarding the one or more platform features and the update module 108 updates the feature discovery logic, situational awareness information, personalized user information, or feature information according to the user's response to presentation of the information regarding the one or more platform features.

According to aspects of the present disclosure, feature discovery may be incorporated as a component of the platform 101 or it may be implemented independently of the platform. For example, in the case of a device, such as a desktop computer, laptop computer, tablet computer, smart phone, or gaming console device, the user intent determination module 102, feature discovery logic 104, message generation module 106, and update module 108 could be integrated into the operating system for the device. In the case of a software platform, e.g., a cloud-based software application, the user intent determination module 102, feature discovery logic 104, message generation module 106, and update module 108 could be implemented in software stored on a server, on a client device, or partly on a server and partly on a client device.

Figure 2A:
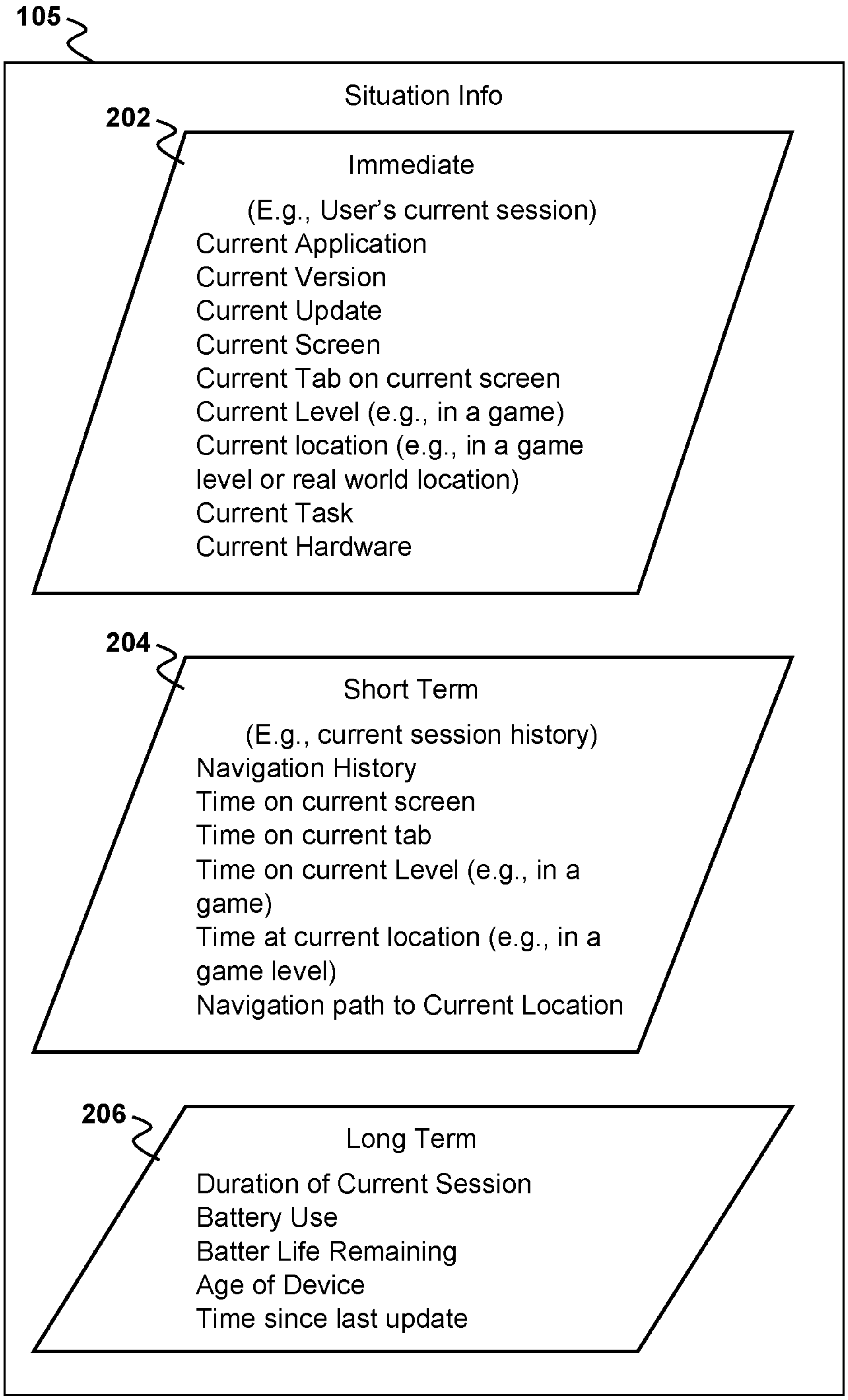
FIG. 2A is a block diagram illustrating an example of situational awareness information according to an aspect of the present disclosure.

In general terms, the situation information 105 generally relates to the user's present situation with respect to the platform but involves little or no user-specific information. As shown in FIG. 2A, such information may include immediate information 202 that relates, e.g., to the current platform session or current task within the session. Situation information is generally obtainable from or provided by the platform itself or can be derived from such information. Immediate situation information may include, e.g., the current hardware, current application, current version of the application, current update, current application screen (for applications having multiple screens), current tab on current screen (for screens having multiple tabs), current level (e.g., in a game), current location (e.g., in a game level or real world location), and the current task. The situation information may further include intermediate term information 204, e.g., information regarding the history of events leading up to the current platform session or current task within the session. Such information may include, e.g., screen navigation history, time on current screen, time on the current tab, time at the current level (e.g., in a game), time at current location (e.g., in a game level or at a real world location), and navigation path leading to the current location. In addition, the situation information 105 may include longer term information 206. Such information may include, e.g., the duration of the current session, battery use information, battery life remaining, the age of the device, or the time since the last update to the platform or hardware used to access the platform.

Figure 2B:
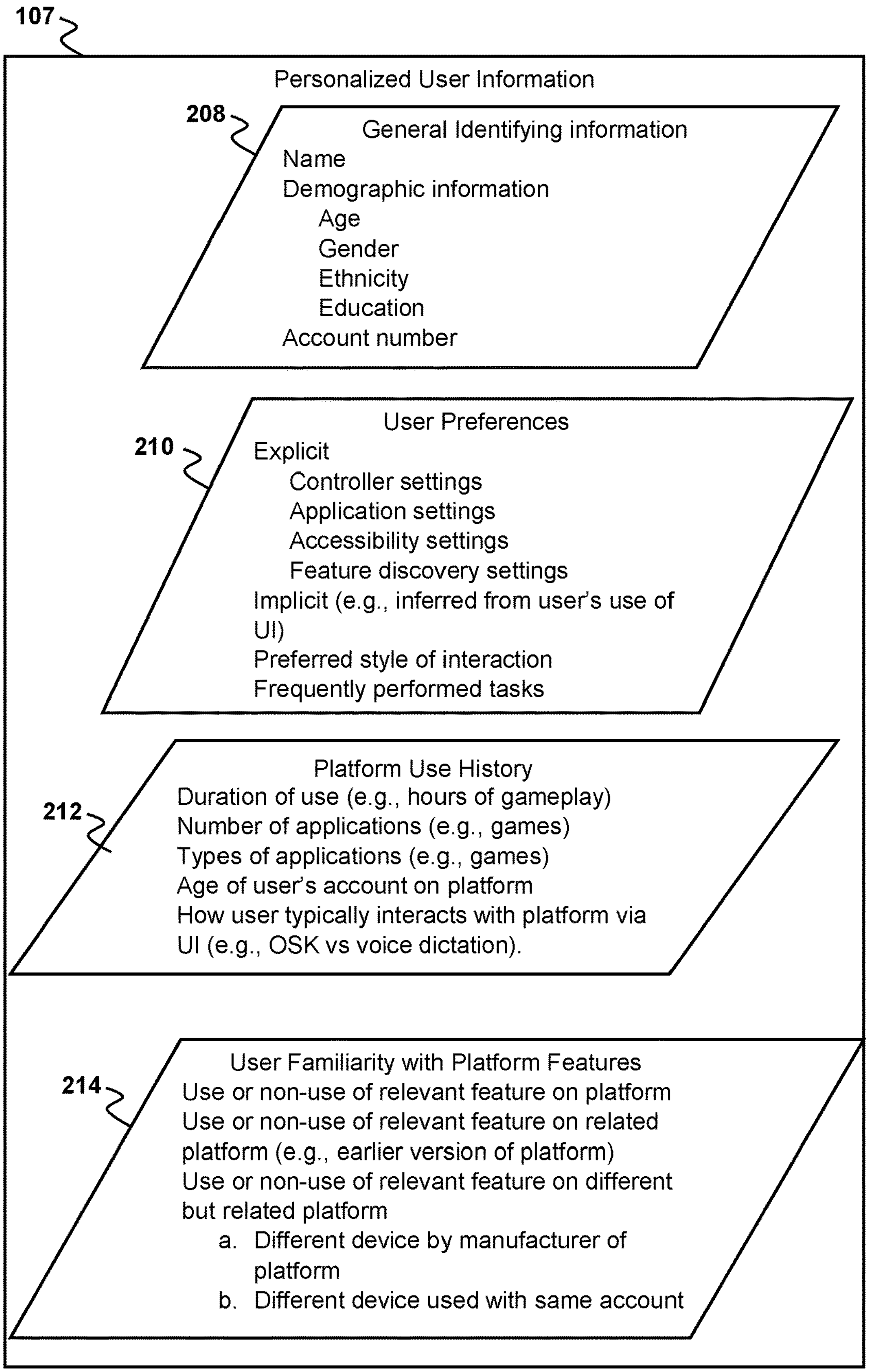
FIG. 2B is a block diagram illustrating an example of personalized user information according to an aspect of the present disclosure.

In general terms, the personalized user information 107 relates to the user but may also interrelate to the user and the platform. By way of example, and not by way of limitation, as shown in FIG. 2B, the user information 107 may include general information 208 identifying the user, such as the user's name, demographic information such as the user's age, gender, ethnicity, and education, and a platform account number, if applicable. The user information 107 may further include user preferences 210. These may include explicit preferences, such as controller settings, application settings, accessibility settings, and feature discovery settings as well as implicit preferences, inferred, e.g., from the user's use of the UI 103 or a preferred mode of interaction (e.g., on-screen keyboard versus game controller, versus voice command) inferred from the user's history of use of the platform, and frequently performed tasks. In some implementations, explicit preferences may be associated with explicit user actions. For example, if a game console user has plugged a peripheral hardware device into the console, the feature discovery system can associate the presence of the peripheral with the explicit act of plugging it in. Other examples may be associated with hardware features, such as turning on Voice Command settings, updating the console's operating system, or whether the user is member of a game subscription service linked to the console or an application.

Implicit settings may be inferred from platform use history 212, which may include, e.g., duration of use (e.g., cumulative hours of gameplay), number of applications (e.g., games) used, types of applications (e.g., games) used, the age of the user's account on the platform and information relating to how the user typically interactions with the platform via the user interface 103, e.g., the number of times the user used the on-screen keyboard, controller, voice dictation or voice commands. The user information 107 may additionally include information relating the user's familiarity with platform features 214. Such information may indicate whether and how often a user has used a particular feature on the platform or on a related platform, such as an earlier version of the platform. The information 214 may also indicate whether the user has used or not used a feature on a different but related platform, such as a different device or program from the manufacturer of the platform 101 or a different device used the same account as the platform 101.

Figure 3:
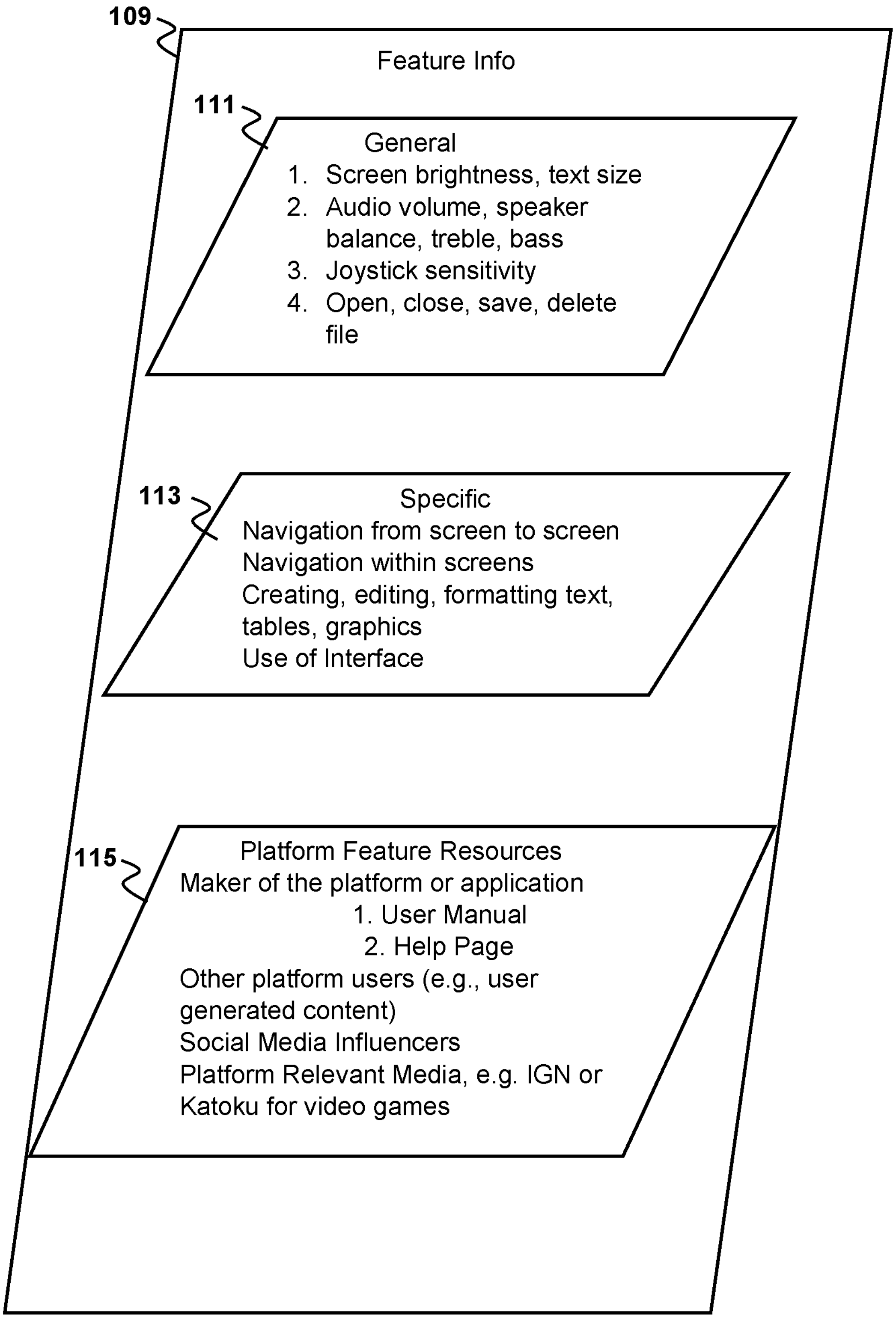
FIG. 3 is a block diagram illustrating an example of feature information according to an aspect of the present disclosure.

The user intent determination module 102, feature discovery logic 104, message generation module 106 and update module may also access platform feature information 109. Such information may include, e.g., an electronic user manual including text, graphics, hypertext links and other information relating to features of the platform. As shown in FIG. 3, the platform feature information 109 may be subcategorized, e.g., into general information 111 and specific information 113. General information may be independent of any specific task or common to multiple tasks. By way of example, and not by way of limitation, the general information 111 may include information relating to screen brightness, text size, audio volume, speaker balance, treble, bass, joystick sensitivity and common tasks, such as opening, closing, saving, and deleting files. Specific information 113 may be associated with a particular task. Examples of specific information include, but are not limited to information relating to navigation from screen to screen, navigation within screens, creating, editing, formatting text, tables, graphics, and use of the interface 103.

The platform feature information 109 may also include information relating to feature discovery resources 115, e.g., links to various sources of information regarding platform features. Sources of such information may include, but are not limited to the maker of the platform or application, e.g., a user manual or help page, other platform users, e.g., user generated content available on social media, social media influences, and platform-relevant media, e.g., IGN or Katoku for video games. In some implementations, the feature discovery resources 115 may leverage a wide variety of existing content created in conjunction with the platform. For example, many games have tournaments and video of these tournaments is often recorded and stored online. The message generation module 106 and/or update module 108 may repurpose such videos for game help, e.g., by selectively editing or annotating them to emphasize use of platform features.

According to aspects of the present disclosure, the situation information 105, personalized user information 107, and feature discovery information 109 may be stored in electronic form in any suitable medium or device. For example, in the case of a device, such as a desktop computer, laptop computer, tablet computer, smart phone, or gaming console device, the situation information 105, personalized user information 107, and feature information 109 may be stored in a memory or mass storage that is integrated into the device or accessible to the device over a network. In the case of a software platform, e.g., a cloud-based software application, the situation information 105, personalized user information 107, and feature information 109 may be stored at a server, e.g., a storage server that is accessible to users of the platform through electronic devices they use to access the platform. By way of example, and not by way of limitation, the situation information 105, personalized user information 107, and feature discovery information 109 may be organized in one or more relational databases that can be queried by the user intent determination module 102, feature discovery logic 104, message generation module 106. Furthermore the update module 108 may be configured to update information stored in such databases.

In some implementations, the situation information 105, user information 107 and feature information 109 could be associated with multiple different platforms or different titles for a given platform associated with a given user account. The user intent determination module 102, feature discovery logic 104, message generation module 106 and update module could be implemented on remote servers that can access the feature discovery information associated with the account.

Figure 4:
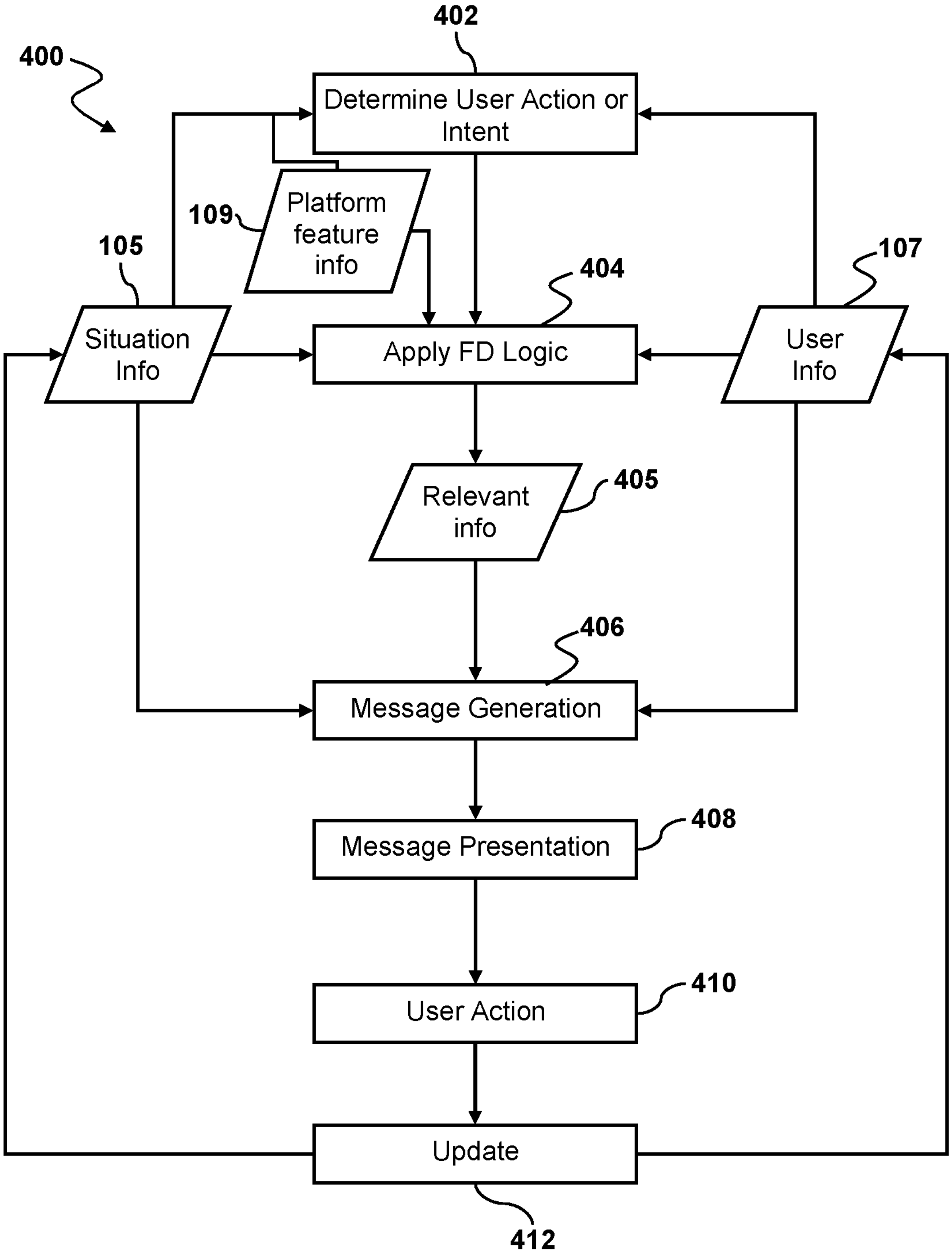
FIG. 4 is a flow diagram of a method for feature discovery according to an aspect of the present disclosure.

Operation of the modules may be understood by referring to the flow diagram depicted in FIG. 4 in conjunction with FIG. 1, FIG. 2, and FIG. 3. In FIG. 4, a method for feature discovery 400 begins with a determination of user action or intent, as indicated at 402. Specifically, the user intent determination module 102 may apply machine learning to situation information 105, such as the current application (or game) current screen, current tab or level to narrow down the range of possible actions the user may be attempting to take. The user intent determination module may also analyze input from the user interface 103, e.g., to determine whether the user is using a mouse, joystick, keyboard, on-screen keyboard or other interface element to further limit the range of possible actions the user may be attempting to take with the user interface. The user intent determination module may further take into account relevant user information 107, such as user preferences 210 to narrow down the types of actions the particular user is more likely to try to attempt based on preferences 210, platform use history 212 or familiarity with platform features 214. Furthermore, the user intent determination module 102 may utilize feature information 109, e.g., to determine what actions are possible given the user's situation and preferences.

In some implementations, the user intent determination module 102 may use artificial intelligence (AI), e.g., machine learning, to determine whether the user is having difficulty with the task at hand. This may involve applying machine learning to situation information 105 such as whether the user is spending too much time on task or using too many keystrokes for the task. The user intent determination module 102 may also review the user's screen navigation history, e.g., to determine if the user has been navigating from screen to screen or tab to tab as though searching for something. In some implementations, the user intent determination module 102 may also analyze video or audio of the user for signs of frustration and associate instances of frustration with the user's operation of the user interface 103 and/or screen navigation in an effort to isolate what may be causing the frustration.

Once the user's intent is determined, the feature discovery system 100 applies the feature discovery logic 104 to the determined intent, the relevant situation information 105, user information 107 and platform feature information 109. The feature discovery logic 104 attempts to determine which information to present to the user regarding platform features. In some implementations, the feature discovery logic 104 may apply machine learning to the situation information 105 to determine why the user is having trouble and what features relevant to overcoming the trouble. By way of example, the feature discovery logic 104 could analyze a user's frequent tasks and identify features that make performing those tasks faster or more efficient. The feature discovery logic could suggest something useful based on user behavior. For example the feature discovery logic could determine from the feature information 109 that the platform supports voice dictation and could determine from the situation information 105 that the user frequently uses the on-screen keyboard but hasn't used voice dictation.

There are other ways in which a user's current situation relative to the platform may trigger feature discovery. In the case of video game platforms, feature discovery could be triggered based on what happens to a user in a game. The feature discovery logic 104 could filter its recommendations according to the user's experience with the platform 101. For example, a longer period of use may imply greater familiarity with platform features. By contrast, a first time use of the platform may imply little or no familiarity with platform features. To facilitate filtering of recommendations, the situational awareness information 105 or user information 107 may include a heat map of features that user has and hasn't used.

The feature discovery logic 104 may utilize machine learning or a heuristic to determine what features are relevant to what the user is trying to do. The relevant features depend on the user's determined intent. For example, in some situations, the user may be attempting to utilize or modify general platform features, such as adjusting screen brightness, text size, audio volume, speaker balance, treble, bass, joystick sensitivity. Alternatively, the user may be attempting to perform general platform tasks such opening, closing, saving or deleting files. Furthermore, the user may be attempting to utilize application specific features such as navigating from screen to screen within an application or video game, navigating within a screen or creating, editing, or formatting, text, tables, and/or graphics. The feature discovery logic may output relevant information 405, e.g., in the form of descriptors or keywords that can be correlated to the relevant feature or features. Each descriptor may be ranked according to its relevance to the determined user intent.

The feature discovery logic outputs the relevant information 405 on the help the user needs to the message generation module 106, which may take relevant situation information 105 and relevant user information 107 into account in isolating relevant feature information 109 and generating a message at 406. For example, if the relevant information 405 is in the form of ranked descriptors, the message generation module may query a database of feature discovery content to determine which content items to present in the message.

The message generation module 106 may access different feature discovery resources 115 discussed above to generate the message. Alternatively, feature discovery tips may be based on timing or based on a user profile. A tip may be based on timing of a specific user action. For example, when a user plugs in newly-purchased headphones, the feature discovery logic 104 may trigger the message generation module 106 to launch a tip that walks the user through core features of the headphones. Alternatively, tips may be based on what has happened (or has not happened) during a past period of time. For example, if a user enables a Voice Command feature but has not used it for four weeks, the feature discovery logic 104 may trigger the message generation module to launch a tip that helps educate users to the benefits of using Voice Command.

Furthermore, "tips based on timing" also include tips based on context or state. The platform 101 has knowledge of what has happened in the past, what is happening at present and therefore can intelligently predict what is likely to happen in the future. Therefore, the feature discovery logic 104 may utilize such contextual clues to trigger the message generation module 106 to proactively inform the user of helpful or new features which are relevant to what the user is likely to do next.

The message generation module 106 may also utilize the relevant user information 107 to tailor the message to the user. Ideally, messages should show users how to make their time on the platform efficient.

The message is presented to the user, as indicated at 408, e.g., through appropriate elements of the user interface 103. In some implementations, the message may be presented with a related device coupled to the platform via the user interface, such as a smart phone, smart watch, tablet computer, or Bluetooth connected audio/video device, e.g., on an automobile.

The message may be presented according to the user's preferred style of feature discovery presentation. By way of example, the style may be short, summary, or detailed. A short message may be a quick hint or suggestion, e.g., "check out action cards" with a link to more detailed relevant information or "use ALT+TAB to switch between windows". A summary message may include a short paragraph, video, audio, or animation showing how the relevant feature is used. A detailed message may include text, video, audio, or animation explaining how to navigate to the relevant screen for selecting the feature, how the feature works, and how to activate it and deactivate it.

To engage the user without annoying the user, the message generation module 106 preferably interacts with the user the same way the user interacts with the platform. For example, the platform could analyze user speech to determine the type of response the user is most likely to appreciate. Alternatively, the message generation module 106 may analyze input events, e.g., click, dwell events, on-screen keyboard (OSK) character count, message events to determine a player's style of interaction as, e.g., detailed, summary, or short. The system could use voice print, facial recognition, etc. to identify the user. The level of detail may depend on what content the user is consuming and how engaged the user is with the content. The message generation module 106 may use AI logic to personalize message according to explicit settings or inferred information. Explicit settings, e.g. short, summary or detailed could be set by a simple radio button. In some implementations, the platform 101 may be configured to navigate users to a screen that asks how they like information presented (detailed, summary, or short). As an example of inferred information, a user may have upgraded to the platform 101 from a previous version of the platform. The platform feature information 109 could indicate which features of the platform 101 might be new to the user and more detailed messages could be presented for those features.

If multiple messages might be equally relevant, the message generation module may prioritize messages. By way of example, messages may be prioritized according to the source of message. For example, a tip from a user's friend might be higher priority than one generated by the system from the user manual. Messages may be prioritized according to the user's current presence within the platform, e.g., a tip for the screen the user is currently on might have higher priority than one for a different screen. In addition, tips might be prioritized by context, e.g., a tip that solves one problem may also solve another one but not vice versa.

The format of timing and presentation of tips with an element of the user interface 103 is often important. The message may be in an audio/visual format presented on a screen. The message may include text, graphics, images, video or audio content. Such content may be recorded, synthesized or dynamically generated, i.e., created in one language and personalized in another. Audio content may include recorded or synthesized speech, sound effects, or music. Messages may also include hyperlinks to such content. In some implementations, the message may be relevant to a controller or other user interface. In such cases, the message could include flashing lights on relevant buttons or switches or activating haptics on the controller or other user interface.

After the message has been presented, the user may take an action at 410, e.g., using the interface 103. The update module 108 may take the user's action into account in updating the situation information 105, and/or user information 107 and/or platform feature information 109, as indicated at 412. For example, if the user acts on the message presented by using a new feature, the situation information 105 may be updated to reflect the new situation and the user information 107 may be updated to reflect the use of the feature. Furthermore, the update module may be configured to determine from the user's action whether the user is aware of the feature described in the message but is ignoring it. The update module may take this into account in updating the situation information 105, and/or user information 107 and/or platform feature information 109. In some implementations, the update module 108 may present the user with an opportunity to add a tip regarding a feature through the user interface 103. The user may generate the tip in any suitable form, e.g., text, recorded audio, recorded video, graphics or animation. Such user feedback may be incorporated in the feature information 109. Alternatively, the user could recommend, or be prompted to recommend a tip to another user.

Some platforms, such as video game platforms may award users with feature discovery trophies or loyalty points for discovering and using features. By way of example and not limitation, loyalty points could be awarded for each instance in which the user discovers a new feature or provides a feature discovery tip. By way of example, for video game platforms, loyalty points could be exchanged for upgrades, virtual assets such as weapons or vehicles, credit towards new games, or game-related merchandise. In such implementations, the feedback module 108 may track users' discovery of features or generation of tips, compute and track loyalty points or award trophies. Loyalty points or trophies could be awarded when a user completes certain feature discovery tasks. Such tasks could include, e.g., reading some predetermined number of feature discovery tips, completing some predetermined number of onboarding tours, or sharing a tip that is not currently available, e.g., not currently included in the feature information 109. These may be digital rewards gifted to the user upon executing specific events. In context of software applications, the user's execution of newly discovered features may trigger the software to award them either an otherwise unattainable (non-purchasable) graphical element for display on their profile page (i.e. a "trophy") or a platform-specific currency ("loyalty points") which may be traded for select digital goods that are associated with the platform but not redeemable for cash. Conceptually, such a non-fungible awards system acts as a motivator for users to continue exploring new features and/or acting on feature discoverability notifications.

Figure 5:
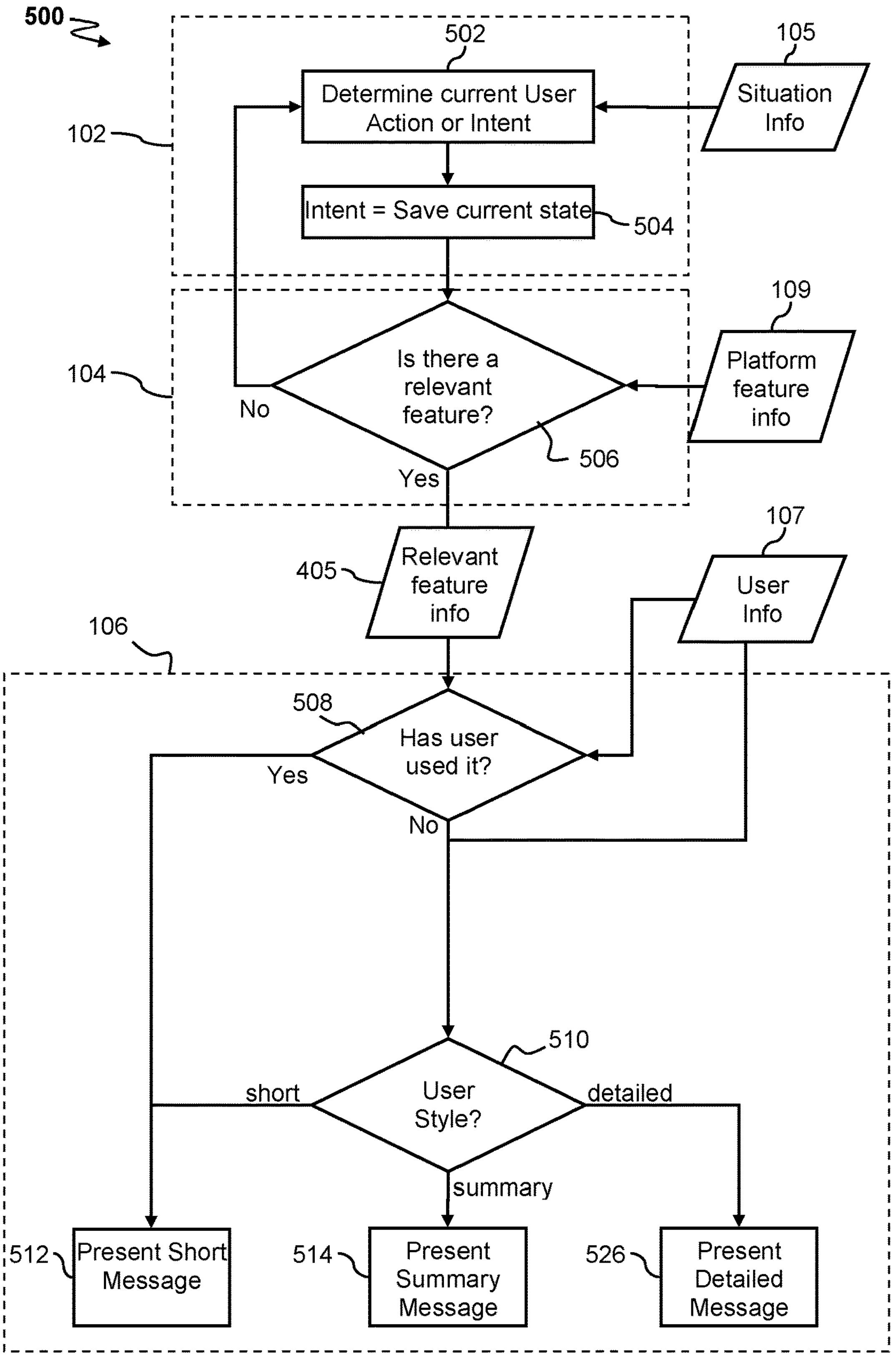
FIG. 5 is a flow diagram illustrating an example of a heuristic that may be used in feature discovery according to an aspect of the present disclosure.

FIG. 5 depicts a non-limiting example of a heuristic that may be used in feature discovery according to an aspect of the present disclosure. In the illustrated example, a user has been paused at a particular point in a video game. The situation determination module 102 receives situation information 105 indicating that the user has taken no action for several minutes other than repeatedly typing the word "save" using an on-screen keyboard (OSK). The user intent determination logic 102 may use a text analyzer that matches the word "save" to words or phrases used in the user manual or a dictionary or videos in an online video database or other sources of feature information 109. The user intent determination module 102 analyzes the situation information 105 and feature information 109 at 502 and determines that it is possible to save the current state of the game and that, given the length of time the user has been paused, the user is trying to save the state of the game, as indicated at 504. The feature discovery logic may 104 determine from the situation information 105 that the user is attempting to use the OSK. The feature discovery logic may 104 alternatively determine from the user information 107 that the user prefers to use the OSK. Utilizing this information, the feature discovery logic 104 may analyze the platform feature information 109 to locate information relevant to saving the game state using the on-screen keyboard, as indicated at 506. For example, entries in the feature information 109 may be arranged in a database having metadata, such as keywords, mapped to items of content, e.g., articles, user manual entries, videos, or web pages. The feature discovery logic 104 may search the feature information 109 for keyword combinations or other metadata combinations, e.g., entries mapped to both "save" and "OSK" to find relevant feature information. If there is no relevant feature, the system may again attempt to determine the user's intent at 502. If there is a relevant feature, then the relevant feature information 405 may be passed to the message presentation module 106. By way of example, the relevant feature information 405 may include information identifying one or more feature discovery database entries that map to both keywords "save" and "OSK".

The message presentation logic 106 may query the user information 107 to determine whether the user has previously used the feature, as indicated at 508. The answer to this query may affect the message that is ultimately presented to the user. For example, if the user has used the feature before, a short message may be more appropriate, though not always. For example, the message presentation logic 106 may further query the user information 107 to determine the user's preferred style, as indicated at 510. If the user's style is "short", a short message is presented at 512. If the user's style is "summary" a summary message is presented at 514. If the user's style is "detailed" a detailed message is presented at 516.

There are a number of ways to determine the user's preferred style of message. For example, if the user communicates in party or on screen keyboard (OSK) the situation determination module 102 can determine how many characters they use during chat or searching. If the person uses few characters during chat or searching the situation determination module 102 may update the user information 107 so that the message presentation module 106 can tailor the message to the user's communication style.

There are a number of ways in which the message presentation module 106 may tailor the message to the user. Specifically, the message presentation module may include a text generation element that takes into account general identifying information 208 to create the message. Such information may be associated with the user's account number. For example, the message may be personalized by incorporating the user's name. The user's age, gender, ethnicity and education may also be taken into account in determining the style of the message, and in choosing colloquial expressions, slang or technical terms that may appear in the message. The message generation module 106 may also determine the user's preferred style according to explicit or implicit user preferences 210, platform use history 212 or familiarity with platform features 214, e.g., as discussed above. For example, a user who has previously used a feature on the same or a different platform and/or has been presented with a message regarding that feature may benefit from a short message as a reminder rather than a summary or detailed message.

In some implementations, the message generation module could access existing user data, e.g., from user profile in user's account on the platform 101 to tailor the message. Such profile information might include accessibility issues, e.g., vision or hearing impairment. The message generation module may use this information to determine, e.g., whether to present the message as synthesized text or synthesized speech. In other implementations, message personalization could be cohort based. The message generation unit could personalize the message by finding a similar user with a similar profile and customize the message based on the similarities between the two profiles. Messages could also be personalized based on a user's social media. For example, if a friend of the user is known to have used a feature the message may include an image of the friend's face along with text indicating that the friend has used the feature.

Figure 6A:
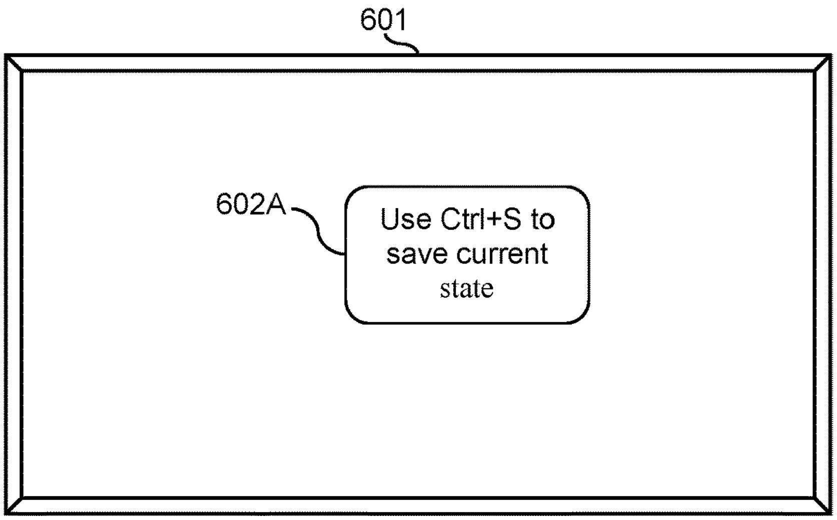
FIG. 6A depicts a screen shot displaying an example of short form feature discovery information according to an aspect of the present disclosure.
Figure 6B:
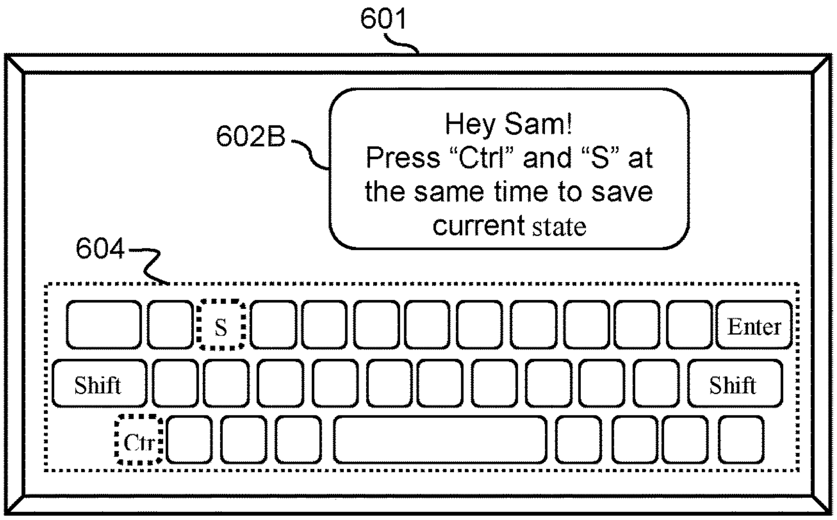
FIG. 6B depicts a screen shot displaying an example of summary form feature discovery information according to an aspect of the present disclosure.
Figure 6C:
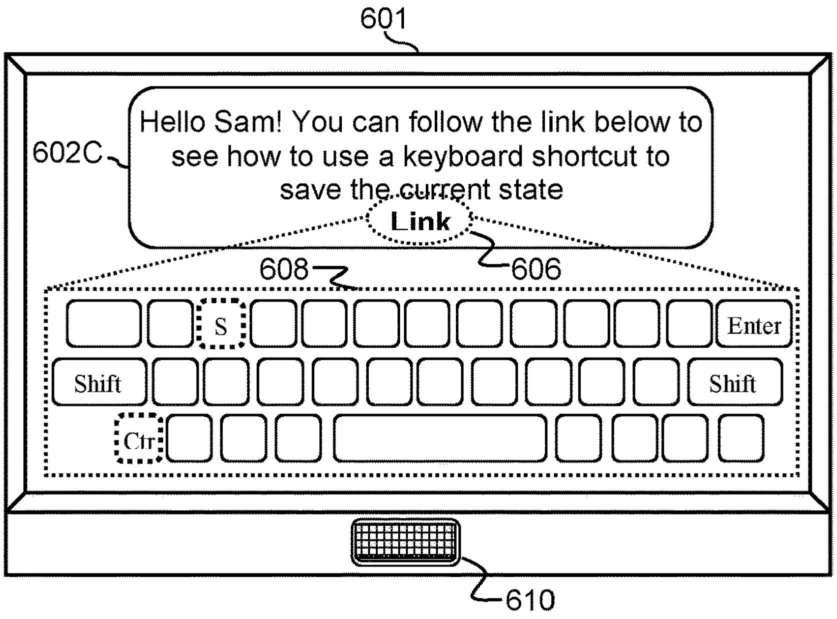
FIG. 6C depicts a screen shot displaying an example of detailed form feature discovery information according to an aspect of the present disclosure.

FIGS. 6A-6B illustrate non-limiting examples of feature discovery messages that may be presented according to aspects of the present disclosure. As discussed above, there are a number of different ways for the message generation unit to present the same basic information, such as short, summary, and detailed messages. FIG. 6A depicts an example of a short message. In this example, a visual display 601 presents a short text message 602A that briefly describes how to use the keyboard to save the current state. FIG. 6B depicts an example of a summary message. In this example, in addition to a text message 602B, the display presents an image of a keyboard 604 highlighting the keys to press to save the current state. Also, the text message 602 has been personalized with the user's name and is more specific than the message 602A of FIG. 6A. FIG. 6C depicts an example of a detailed message. In this example, in addition to a personalized text message 602C, the message includes a link 606, which is configured to cause the display 601 to present an animation 608 of a keyboard 604 demonstrating the keys to press to save the current state when the user activates the link. Although not shown in FIG. 6C, the message may further include audio that accompanies the animation 608. The audio may be presented with a speaker 610 that is part of or otherwise coupled to the display 601.

According to alternative aspects of the message generation module 106 may present messages independent of a determined need for assistance with a task. Messages could be presented at opportune times. For example, when a user first begins using a new platform, the feature discovery system 100 could present personalized and whimsical message on user's social media page as soon as user accesses the platform on for the first time. Feature discovery messages might be presented during relatively inactive moments, e.g., during system boot-up or between levels of a video game.

Machine Learning

According to aspects of the present disclosure, the modules of the feature discovery system 100 may utilize machine learning programs to determine such things as what the user is trying to do, whether the user is having difficulty doing it, why the user is having trouble, what information to present to the user and how to present it.

According to aspects of the present disclosure, the Feature Discovery system may include one or more of several different types of neural networks and may have many different layers. By way of example and not by way of limitation a classification neural network may consist of one or multiple deep neural networks (DNN), such as convolutional neural networks (CNN) and/or recurrent neural networks (RNN). The type of neural network used depends on the type of input data. For example, CNN are highly suitable for classifying images and RNN are well-suited to sequential data like time series, speech, text, financial data, audio, video, and weather.

The Feature Discovery system described herein may be trained using a general training method, such as the one discussed below.

Figure 7A:
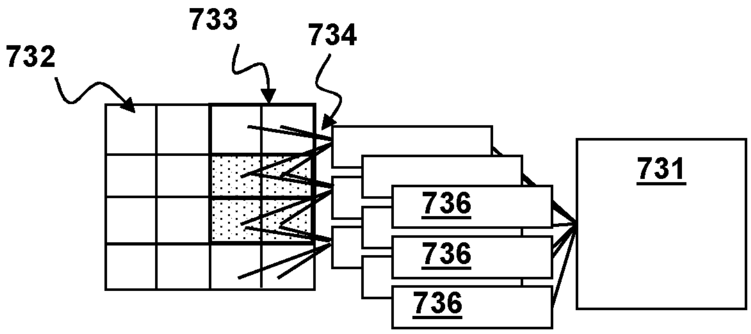
FIG. 7A is a simplified diagram of a convolutional neural network that may be used in feature discovery according to aspects of the present disclosure.

FIG. 7A depicts an example layout of a convolution neural network that may be used in various parts of a feature discovery system according to aspects of the present disclosure. In this depiction, the convolution neural network is generated for an input 732 with a size of 4 units in height and 4 units in width giving a total area of 16 units. The depicted convolutional neural network has a filter 733 size of 2 units in height and 2 units in width with a stride value of 1 and a channel 736 of size 9. For clarity in FIG. 1A only the connections 734 between the first column of channels and their filter windows are depicted. Aspects of the present disclosure, however, are not limited to such implementations. The convolutional neural network may have any number of additional neural network node layers 731 and may include such layer types as additional convolutional layers, fully connected layers, pooling layers, max pooling layers, normalization layers, etc. of any size.

Figure 7B:
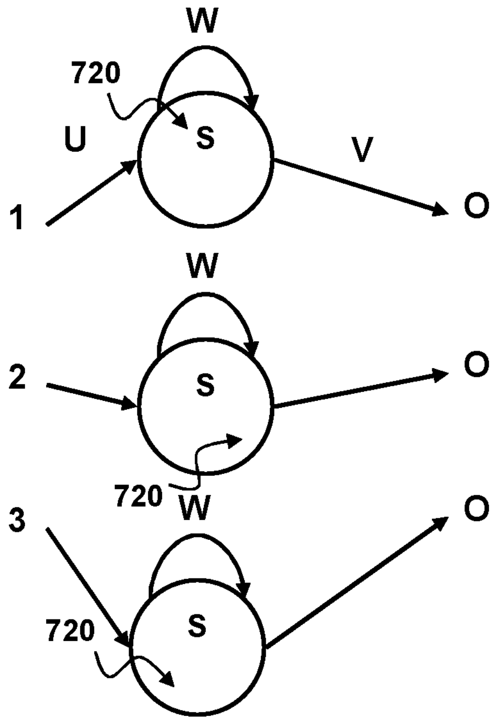
FIG. 7B is a simplified node diagram of a recurrent neural network that may be used in feature discovery according to aspects of the present disclosure.
Figure 7C:
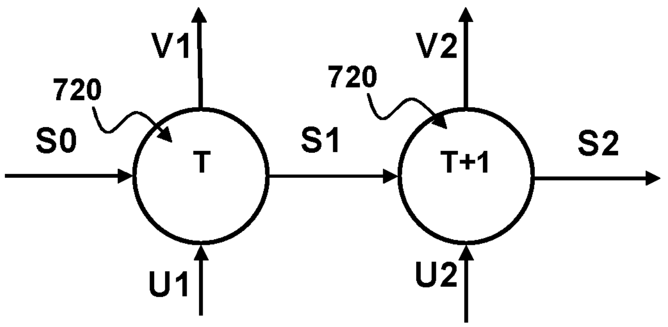
FIG. 7C is a simplified node diagram of an unfolded recurrent neural network for that may be used in feature discovery according to aspects of the present disclosure.

For illustrative purposes a RNN is described herein, it should be noted that RNNs differ from a basic NN in the addition of a hidden recurrent layer. FIG. 7B depicts the basic form of an RNN having a layer of nodes 720, each of which is characterized by an activation function S, input U, a recurrent node weight W, and an output V. The activation function S is typically a non-linear function known in the art and is not limited to the (hyperbolic tangent (tan h) function. For example, the activation function S may be a Sigmoid or ReLU function. As shown in FIG. 7C, the RNN may be considered as a series of nodes 120 having the same activation function with the value of the activation function S moving through time from S0 prior to T, S1 after T and S2 after T+1. The nodes in a layer of RNN apply the same set of activation functions and weights to a series of inputs. The output of each node depends not just on the activation function and weights applied to that node's input, but also on that node's previous context. Thus, the RNN uses historical information by feeding the result from a previous time T to a current time T+1.

In some embodiments, a convolutional RNN may be used, especially when the visual input is a video. Another type of RNN that may be used is a Long Short-Term Memory (LSTM) Neural Network which adds a memory block in a RNN node with input gate activation function, output gate activation function and forget gate activation function resulting in a gating memory that allows the network to retain some information for a longer period of time. The units of an LSTM are used as building units for the layers of a RNN, often called an LSTM network. LSTMs enable RNNs to remember inputs over a long period of time. This is because LSTMs contain information in a memory, much like the memory of a computer. The LSTM can read, write and delete information from its memory. An LSTM network may be particularly useful, e.g., to analyze user profile history over long periods of time. For example, in the context of the present disclosure an LSTM network may be used to analyze sequential data to determine if the user is spending too much time on a task or is using too many keystrokes for the task. Alternatively, an LSTM network may analyze a user's screen navigation history to determine if the user appears to be searching for something. In addition, an LSTM network may analyze video or audio of user to detect signs of frustration.

Figure 7D:
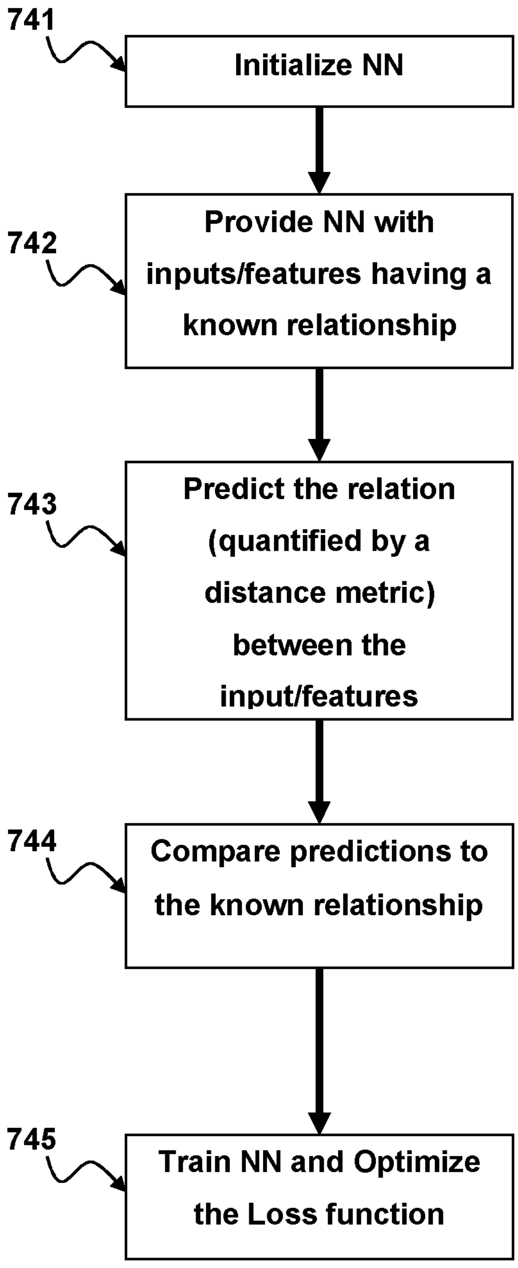
FIG. 7D is a block diagram of a method for training a neural network that may be used that may be used in feature discovery according to aspects of the present disclosure.

As seen in FIG. 7D Training a neural network (NN) begins with initialization of the weights of the NN at 741. In general, the initial weights should be distributed randomly. For example, an NN with a hyperbolic tangent (tan h) activation function should have random values distributed between $$-\frac{1}{\sqrt{n}} \text{ and } \frac{1}{\sqrt{n}}$$

where n is the number of inputs to the node.

After initialization the activation function and optimizer are defined. In artificial neural networks, the activation function (also known as the transfer function) defines the output of that node given an input or set of inputs. An activation function of an artificial neural network determines whether a node should be activated or not. Examples of activation functions include linear, non-linear, sigmoid, hyperbolic tangent (tan h), rectified linear unit (ReLu) and leaky ReLu activation functions. The optimizer adjusts the parameters for a model. More specifically, the optimizer adjusts model weights to maximize or minimize a loss function. The loss function is used as a way to measure how well the model is performing. An optimizer must be used when training a neural network model.

After the activation function and optimizer are defined, the NN is then provided with a feature vector or input dataset at 742. Each of the different feature vectors may be generated by the NN from inputs that have known relationships. Similarly, the NN may be provided with feature vectors that correspond to inputs having known relationships. The NN then predicts a distance between the features or inputs at 743. The predicted distance is compared to the known relationship (also known as ground truth) and a loss function measures the total error between the predictions and ground truth over all the training samples at 744. By way of example and not by way of limitation the loss function may be a cross entropy loss function, quadratic cost, triplet contrastive function, exponential cost, mean square error etc. Multiple different loss functions may be used depending on the purpose. By way of example and not by way of limitation, for training classifiers a cross entropy loss function may be used whereas for learning an embedding a triplet contrastive loss function may be employed. The NN is then optimized and trained, using known methods of training for neural networks such as back propagating the result of the loss function and by using optimizers, such as stochastic and adaptive gradient descent etc., as indicated at 745. In each training epoch, the optimizer tries to choose the model parameters (i.e., weights) that minimize the training loss function (i.e. total error). Data is partitioned into training, validation, and test samples.

During training, the Optimizer minimizes the loss function on the training samples. After each training epoch, the model is evaluated on the validation sample by computing the validation loss and accuracy. If there is no significant change, training can be stopped and the most optimal model resulting from the training may be used to predict the labels or relationships for the test data.

Thus, the neural network may be trained from inputs having known relationships to group related inputs. Similarly, a NN may be trained using the described method to generate a feature vector from inputs having known relationships to the corresponding outputs.

Figure 8:
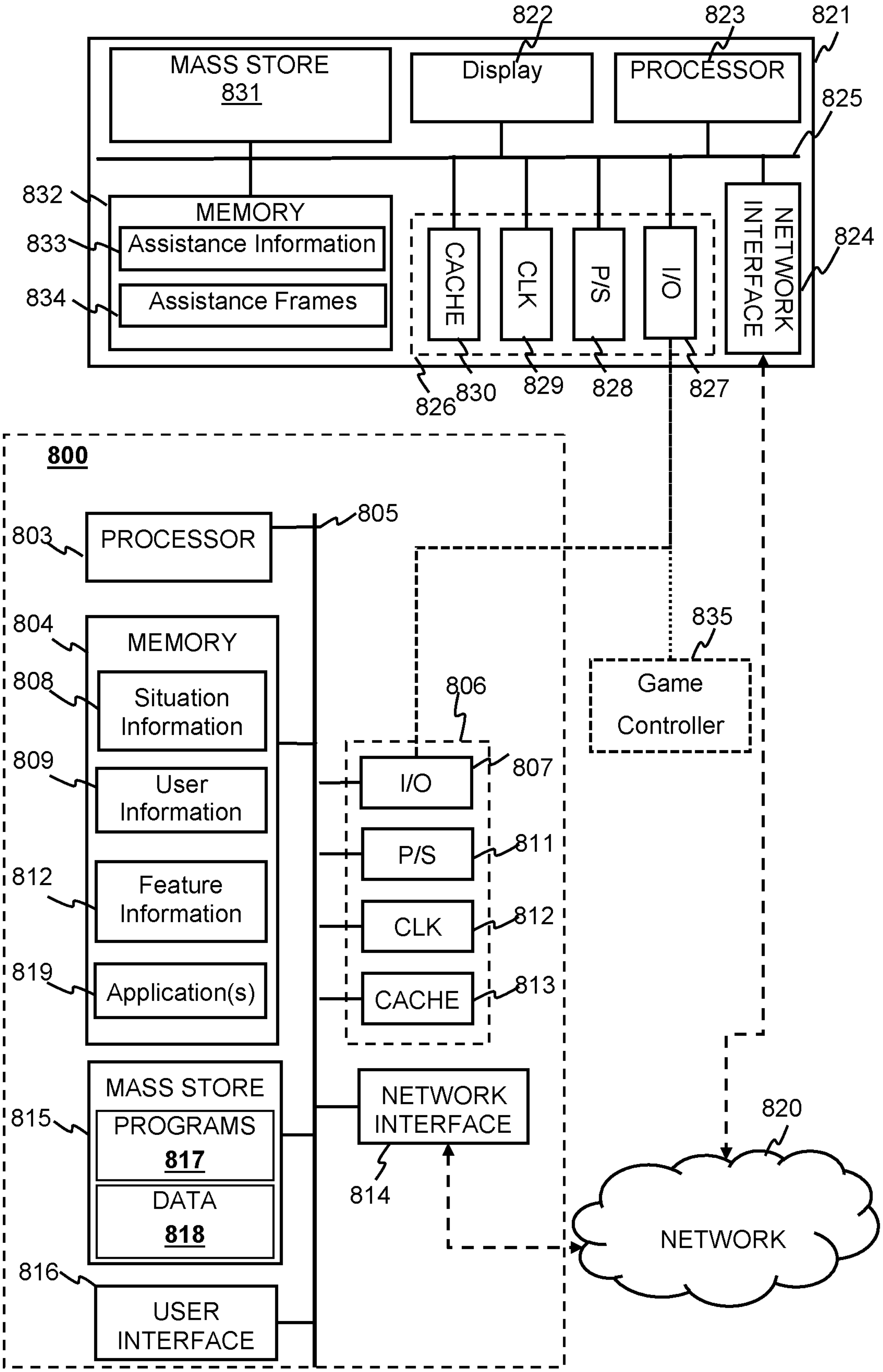
FIG. 8 is a block diagram of an example of a feature discovery apparatus according to an aspect of the present disclosure.

FIG. 8 diagrammatically depicts an apparatus configured to implement feature discovery for a computer platform according to an aspect of the present disclosure. By way of example, and not by way of limitation, according to aspects of the present disclosure, platform feature discovery may be implemented with a computer system 800, such as an embedded system, personal computer, workstation, game console. The computer system 800 used to implement platform feature discovery may be separate and independent of the pertinent platform, which may be an application 819 that runs on the computer system 800 or on a separate mobile device 821, such as a mobile phone, video game console, portable video game device, e-reader, tablet computer or the like. In some implementations, the platform may be the separate device 821 itself.

The computer system 800 generally includes a central processor unit (CPU) 803, and a memory 804. The computer system may also include well-known support functions 806, which may communicate with other components of the computer system, e.g., via a data bus 805. Such support functions may include, but are not limited to, input/output (I/O) elements 807, power supplies (P/S) 811, a clock (CLK) 812 and cache 813.

Additionally, the mobile device 821 generally includes a CPU 823, and a memory 832. The mobile device 821 may also include well-known support functions 826, which may communicate with other components of the mobile device, e.g., via a data bus 825. Such support functions may include, but are not limited to, I/O elements 827, P/S 828, a CLK 829 and cache 829. A game controller 835 may optionally be coupled to the mobile device 821 through the input/output 827. The game controller 835 may be used to interface with the mobile device 821. The mobile device 821 may also be communicative coupled with the computer system through the I/O of the mobile system 827 and the I/O of the computer system 807.

In some implementations, the I/O elements 807, 827 are configured to permit direct communication between the computer system 800 and the mobile device 821 or between the computer system or mobile device 821 and peripheral devices, such as the controller 835. The I/O elements 807, 827 may include components for communication by wired or wireless protocol. Examples of wired communications protocols include, but are not limited to, RS232 and Universal Serial Bus (USB). Examples of wireless communications protocols include, but are not limited to Bluetooth®. Bluetooth® is a registered trademark of Bluetooth SIG, Inc. of Kirkland, Washington.

The computer system includes a mass storage device 815 such as a disk drive, CD-ROM drive, flash memory, solid state drive (SSD), tape drive, or the like to provide non-volatile storage for programs and/or data. The computer system may also optionally include a user interface unit 816 to facilitate interaction between the computer system and a user. The user interface 816 may include a keyboard, mouse, joystick, light pen, or other device that may be used in conjunction with a graphical user interface (GUI). The computer system may also include a network interface 814 to enable the device to communicate with other devices over a network 820. The network 820 may be, e.g., a local area network (LAN), a wide area network such as the internet, a personal area network, such as a Bluetooth® network or other type of network. These components may be implemented in hardware, software, or firmware, or some combination of two or more of these.

The Mass Storage 815 of the computer system 800 may contain uncompiled programs 817 that are loaded to the main memory 804 and compiled into executable form as the application 819. Additionally, the mass storage 815 may contain data 818 used by the processor to implement feature discovery. The data 818 may include one or more relational databases containing data corresponding to the situation information 105, user information 107, and/or feature information 109 discussed above.

The CPU 803 of the computer system 800 may include one or more processor cores, e.g., a single core, two cores, four cores, eight cores, or more. In some implementations, the CPU 803 may include a GPU core or multiple cores of the same Accelerated Processing Unit (APU). The memory 804 may be in the form of an integrated circuit that provides addressable memory, e.g., random access memory (RAM), dynamic random-access memory (DRAM), synchronous dynamic random-access memory (SDRAM), and the like. The main memory 804 may include one or more applications 819 used by the processor 803 to generate for example, a drafting program, a spreadsheet, a video game, a word processor or perform feature discovery as discussed above, e.g., with respect to FIG. 4, FIG. 5, FIG. 6A, FIG. 6B, or FIG. 6C. The main memory 804 may also include user statistics 810 that may be generated during processing of the application 810. The main memory 804 may store portions of situation information 105, user information 107 and feature information 109, which may be configured as discussed above, e.g., with respect to FIG. 2A, FIG. 2B, and FIG. 3, respectively. Additionally the feature information 812 may include a library of tips and tricks for the user or frames of tutorial videos or guides or a database of links to such information. When executed by the processor 803, one or more of the programs 819, may use the information stored in the memory 804 to implement the functions of the user intent determination module 102, feature discovery logic 104, message generation module 106 and update module 108.

The mobile device 821 similarly includes a mass storage device 831 such as a disk drive, CD-ROM drive, flash memory, SSD, tape drive, or the like to provide non-volatile storage for programs and/or data. The mobile device may also include a display 822 to facilitate interaction between the mobile device or mobile trainer system and a user. The display may include a screen configured to display, text, graphics, images, or video. In some implementations, the display 822 may be a touch sensitive display. The display 822 may also include one or more speakers configured to present sounds, e.g., speech, music, or sound effects. The mobile device 821 may also include a network interface 824 to enable the device to communicate with other devices over a network 820. The network 820 may be, e.g., wireless cellular network, a local area network (LAN), a wide area network such as the internet, a personal area network, such as a Bluetooth network or other type of network. These components may be implemented in hardware, software, or firmware, or some combination of two or more of these.

The CPU 823 of the mobile device 821 may include one or more processor cores, e.g., a single core, two cores, four cores, eight cores, or more. In some implementations, the CPU 823 may include a GPU core or multiple cores of the same APU. The memory 832 may be in the form of an integrated circuit that provides addressable memory, e.g., RAM, DRAM, SDRAM, and the like. The main memory 832 may temporarily store information 833, such as situation information, user information, or feature information. Such information may be collected by the mobile device 821 or retrieved from the computer system 800. A mass storage 831 of the mobile device 821 may store such when not needed by the processor 823. Mobile device 821 may be configured, e.g., through suitable programming, to display feature discovery messages generated by the computer system 800.

The CPU 803 of the computer system 800 and the mobile device 821 may be programmable general purpose processors or special purpose processors. Some systems include both types of processors, e.g., a general purpose CPU and a special purpose GPU. Examples of special purpose computers include application specific integrated circuits. As used herein and as is generally understood by those skilled in the art, an application-specific integrated circuit (ASIC) is an integrated circuit customized for a particular use, rather than intended for general-purpose use.

As used herein and as is generally understood by those skilled in the art, a Field Programmable Gate Array (FPGA) is an integrated circuit designed to be configured by a customer or a designer after manufacturing—hence "field-programmable". The FPGA configuration is generally specified using a hardware description language (HDL), similar to that used for an ASIC.

As used herein and as is generally understood by those skilled in the art, a system on a chip or system on chip (SoC or SOC) is an integrated circuit (IC) that integrates all components of a computer or other electronic system into a single chip. It may contain digital, analog, mixed-signal, and often radio-frequency functions—all on a single chip substrate. A typical application is in the area of embedded systems.

A typical SoC may include the following hardware components:

- One or more processor cores (e.g., microcontroller, microprocessor, or digital signal processor (DSP) cores.
- Memory blocks, e.g., read only memory (ROM), random access memory (RAM), electrically erasable programmable read-only memory (EEPROM) and flash memory.
- Timing sources, such as oscillators or phase-locked loops.
- Peripherals, such as counter-timers, real-time timers, or power-on reset generators.
- External interfaces, e.g., industry standards such as universal serial bus (USB), FireWire, Ethernet, universal asynchronous receiver/transmitter (USART), serial peripheral interface (SPI) bus.
- Analog interfaces including analog to digital converters (ADCs) and digital to analog converters (DACs).
- Voltage regulators and power management circuits.

These components are connected by either a proprietary or industry-standard bus. Direct Memory Access (DMA) controllers route data directly between external interfaces and memory, bypassing the processor core and thereby increasing the data throughput of the SoC.

A typical SoC includes both the hardware components described above, and executable instructions (e.g., software or firmware) that controls the processor core(s), peripherals, and interfaces.

Aspects of the present disclosure provide for improved feature discovery for computer platforms. By utilizing situational awareness information and personalized user information, feature discovery messages may be presented in a timely manner that is both helpful to the user and less disruptive to the user's experience on the platform.

While the above is a complete description of the preferred embodiment of the present invention, it is possible to use various alternatives, modifications and equivalents. Therefore, the scope of the present invention should be determined not with reference to the above description but should, instead, be determined with reference to the appended claims, along with their full scope of equivalents. Any feature described herein, whether preferred or not, may be combined with any other feature described herein, whether preferred or not. In the claims that follow, the indefinite article "A", or "An" refers to a quantity of one or more of the item following the article, except where expressly stated otherwise. The appended claims are not to be interpreted as including means-plus-function limitations, unless such a limitation is explicitly recited in a given claim using the phrase "means for."

What is claimed is:

1. A method for feature discovery for a computer platform, comprising:

training a neural network with historical data including user inputs of a plurality of users and platform features of the computer platform having a known relationship;

providing, as input to the neural network, situational awareness information relating to a user's current interaction with the computer platform to identify an intended action of the user with respect to the computer platform;

determining, by the neural network and based at least in part on the intended action of the user, one or more features of the computer platform that are relevant to the intended action;

determining, by the neural network and based at least in part on the user's use of a user interface, personalized user information including a style of interaction of the user with the computer platform, wherein the style of interaction indicates a user preference for presentation of a notification from the computer platform;

generating, by the neural network, a message including at least the one or more features, wherein the one or more features are relevant to the user regarding accomplishing a task based at least in part on a screen navigation history of the user associated with the task, wherein the message indicates how to use the one or more features of the computer platform to accomplish the task;

presenting the message at the user interface in accordance with the style of interaction of the user;

analyzing a response of the user to the message presented at the user interface based on how the user interacts with the user interface; and updating the personalized user information and the situational awareness information according to the response of the user to the presentation of the message regarding the one or more features of the computer platform, wherein updated personal user information is used to determine a manner of presentation of subsequent messages from the computer platform.

2. The method of claim 1, wherein the situational awareness information includes data regarding a general history of use of the user of the platform.

3. The method of claim 1, wherein the situational awareness information includes data regarding a current session of the user on the platform.

4. The method of claim 1, wherein the computer platform is a computer system and the situational awareness information includes data identifying different types of computer applications used by a user system.

5. The method of claim 1, wherein the situational awareness information includes an indication of an interface element for how the user interacts with the computer platform via the user interface.

6. The method of claim 1, wherein determining the one or more features is based at least in part on an amount of time the user has spent on the task.

7. The method of claim 1, wherein determining the one or more features is based at least in part on a number of keystrokes the user has used on the task.

8. The method of claim 1, wherein determining the one or more features is based at least in part on audio or video of the user working on the task.

9. The method of claim 1, wherein determining the one or more features includes determining what features of the computer platform are relevant to the task.

10. The method of claim 1, wherein determining the one or more features includes determining when to present to the user with information relevant to the task.

11. The method of claim 1, wherein determining the one or more features includes determining what information to present to the user regarding platform features that are relevant to a task the user is attempting to accomplish.

12. The method of claim 1, wherein determining the one or more features includes analyzing frequency tasks of the user and recommending the one or more features relevant to the frequency tasks of the user.

13. The method of claim 1, wherein determining the one or more features includes determining what data to present to the user regarding the one or more features of the computer platform that are relevant to a task the user is attempting to accomplish and how to use the one or more features of the computer platform to accomplish the task.

14. The method of claim 1, wherein the data regarding the one or more features of the computer platform is obtained from a pool of feature information provided by persons or entities other than the user.

15. The method of claim 14, wherein the persons or entities other than the user include other users of the platform.

16. The method of claim 14, wherein the persons or entities other than the user include influencers on social media.

17. The method of claim 14, wherein the persons or entities other than the user include media entities relevant to the platform.

18. The method of claim 14, wherein the persons or entities other than the user include a maker of the platform.

19. The method of claim 1, wherein the data regarding the one or more features of the computer platform is selected based on timing.

20. The method of claim 1, wherein the data regarding the one or more features of the computer platform is selected based on a user profile of the user.

21. The method of claim 1, wherein determining the one or more features is based at least in part on information relating to activity of the user with respect to the computer platform.

22. The method of claim 1, wherein determining the one or more features is based at least in part on information relating to a use of another platform of the user.

23. The method of claim 1, wherein determining the one or more features is based at least in part on information relating to the one or more features of the computer platform that the user has or has not previously used.

24. The method of claim 1, wherein determining the one or more features is based at least in part on information relating to a current activity of the user with respect to the computer platform.

25. The method of claim 1, wherein determining the one or more features is based at least in part on information relating to one or more friends of the user.

26. The method of claim 1, wherein determining the one or more features is based at least in part on information relating to an age of an account associated with the platform and the user.

27. The method of claim 1, wherein determining the one or more features includes determining the user's preferred style of feature discovery presentation based at least in part on a selection of content the user is consuming and a level of engagement with the content by the user.

28. A feature discovery system for a computer platform, comprising:

a processor;

a memory coupled to the processor;

executable instructions embodied in the memory and configured, upon execution, to:

train a neural network with historical data including user inputs of a plurality of users and platform features of the computer platform having a known relationship;

provide, as input to a neural network, situational awareness information relating to a user's current interaction with the computer platform to identify an intended action of the user with respect to the computer platform;

determine, by the neural network and based at least in part on the intended action of the user, one or more features of the computer platform that are relevant to the intended action;

determine, by the neural network and based at least in part on the user's use of a user interface, personalized user information including a style of interaction of the user with the computer platform, wherein the style of interaction indicates a user preference for presentation of a notification from the computer platform;

generate, by the neural network, a message including at least the one or more features, wherein the one or more features are relevant to the user regarding accomplishing a task based at least in part on a screen navigation history of the user associated with the task, wherein the message indicates how to use the one or more features of the computer platform to accomplish the task;

present the message at the user interface;

analyzing a response of the user to the message presented at the user interface based on how the user interacts with the user interface; and update the personalized user information and the situational awareness information according to the response of the user to the presentation of the message regarding the one or more features of the computer platform, wherein updated personal user information is used to determine a manner of presentation of subsequent messages from the computer platform.

* * * * *